United States Patent Office 3,163,668
Patented Dec. 29, 1964

3,163,668
METHOD FOR THE MANUFACTURE OF O-ARYL O-LOWER ALKYL PHOSPHOROCHLORIDOTHIOATES
Edward J. Tabor, Midland, Mich., assignor to The Dow Chemical Company, Midland, Mich., a corporation of Delaware
No Drawing. Filed Aug. 7, 1959, Ser. No. 832,153
4 Claims. (Cl. 260—461)

This invention relates to a new and improved method for the manufacture of O-aryl O-lower alkyl phosphorochloridothioates.

These compounds are liquid or crystalline solid materials which are somewhat soluble in many organic solvents and of very low solubility in water. They are valuable as intermediates for the preparation of a variety of more complex phosphorus derivatives, such as O-aryl O-lower alkyl phosphoroamidothioates. In such use, the O-alkyl O-aryl phosphorochloridothioate intermediate is reacted with ammonia or an amine to replace the chlorine atom. The resulting O-aryl O-alkyl phosphoroamidothioates and the intermediate O-alkyl O-aryl phosphorochloridothioates are useful as preservatives for paper, paint, wood and as parasiticides for the control of bacteria, fungi, mites and insects such as aphids, southern army worms, and flies.

It is an object of the present invention to provide a new and improved method for the production of O-lower alkyl O-aryl phosphorochloridothioates. It is a further object to provide a method which is more economical than known methods and gives increased yields of the O-lower alkyl O-aryl phosphorochloridothioates. An additional object is the provision of a method which gives the O-lower alkyl O-aryl phosphorochloridothioates in a very short reaction period and in a purity which has not been obtainable by known methods. Other objects will become apparent from the following specification and claims.

The new and improved method comprises reacting together, substantially equimolecular proportions of an O-lower alkyl phosphorodichloridothioate, an alkali metal hydroxide and a phenolic compound having the formula ROH, wherein R represents an aryl radical, said alkali metal hydroxide being employed in the form of an aqueous solution containing at least 10 percent by weight of the alkali metal hydroxide. The reaction takes place smoothly at temperatures of from 10° to 50° C. with the production of the desired O-aryl O-lower alkyl phosphorochloridothioates in high yields and excellent purity. Upon completion of the reaction, the desired phosphorochloridothioate, if a solid, may be separated by filtration, successively washed with aqueous metal hydroxide and and water dried. Where the phosphorochloridothioate product is a liquid, it may be separated by decantation and thereafter washed as above described to obtain the desired product as a liquid residue.

The employment of an aqueous solution containing at least 10 percent by weight of an alkali metal hydroxide such as sodium hydroxide or potassium hydroxide is essential and critical for the practice of the present invention, and the obtaining of the very desirable and high yields of the phosphorochloridothioate products. In a preferred embodiment of the invention, an aqueous solution containing from 10 to about 25 percent by weight of the alkali metal hydroxide is employed. A concentration substantially less than 10 percent by weight materially reduces the yields of the desired mixed esters and should not be employed. The upper limit of the concentration of alkali metal hydroxide which may be used varies somewhat with the employed alkali metal hydroxide and phenolic reagent. In any event, the concentration of alkali metal hydroxide must not be so high as to produce a thick slurry so that adequate contacting of the reagents cannot be effective. Under such conditions, the yields of the desired phosphorochloridothioate products are materially reduced. Usually, adequate contacting may be maintained at concentrations up to from about 20–25 percent by weight of alkali metal hydroxide. In a preferred operation, an aqueous solution containing from 10–20 percent by weight of alkali metal hydroxide is employed.

The esterification reaction should be carried out at temperatures of from 10°–50° C. and preferably at the temperature range of from 15°–35° C. The reaction takes place smoothly under these temperature conditions with the production of the desired product and alkali metal chloride of reaction. The reaction is somewhat exothermic and the temperature may be controlled by regulating the rate of contacting the reactants and by external cooling. It is essential that temperatures significantly above or below the specified range be not employed for any appreciable period of time as they materially reduce the yields of the desired phosphorochloridothioate products.

The rate at which the formation of the O-lower alkyl O-aryl phosphorochloridothioate takes place has been found to vary directly with the employed temperature, the longer periods being employed at the lower temperatures. In general, the reactants may be contacted at a rate which will permit the control of the temperature within the limit specified. The reaction is generally complete in a period of about 0.5 to 1.5 hours.

In the practice of the present invention, the O-lower alkyl phosphorodichloridothioate, alkali metal hydroxide and phenolic compound are reacted together in substantially equimolecular proportions. In a preferred method, one molecular proportion of phenolic compound is employed with from 1 to 1.1 molecular proportions of O-lower alkyl phosphorodichloridothioate and from 1.15 to 1.3 molecular proportions of alkali metal hydroxide. When operating under such conditions, optimum yields of the desired phosphorochloridothioates are obtained.

In carrying out the reaction, the aqueous solution of the alkali metal hydroxide is added portionwise with stirring to a mixture of the phenolic compound and O-lower alkyl phosphorodichloridothioate. In an alternative method of operation, a mixture comprising the alkali metal hydroxide, phenolic compound and water is added portionwise to the O-lower alkylphosphorodichloridothioate. In any event, the contacting is carried out with stirring and at a temperature of from 10–50° C. Upon completion of the reaction, the reaction mixture is cooled to room temperature and thereafter treated as previously described to separate the desired O-lower alkyl O-aryl phosphorochloridothioate as a liquid or crystalline residue.

EXAMPLE 1

O-(2-Chloro-4-Tertiarybutylphenyl) O-Methyl Phosphorochloridothioate

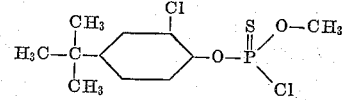

2-chloro-4-tertiarybutylphenol (369 grams; 2.0 mole), 126 grams of potassium hydroxide and 504 grams of water are mixed together and added portionwise with stirring to 355 grams (2.15 mole) of O-methyl phosphorodichloridothioate. The addition is carried out at a temperature of 20° C. with external cooling and over a period of 50 minutes. Following the addition, the reaction mixture is maintained for 30 minutes at a temperature of from 20°–25° C. During the reaction, the reaction mixture separates into an aqueous layer and an organic layer. Following the reaction, the organic layer is separated and successively washed with 15 percent aqueous potassium hydroxide and water, and the washed mixture thereafter dried at a temperature of 65° C. and under a vacuum of 15 millimeters. As a result of these operations, there is obtained an O-(2-chloro-4-tertiarybutylphenyl) O-methyl phosphorochloridothioate as a liquid material in a yield of 89 percent based upon the phenolic starting material.

EXAMPLE 2

A mixture consisting of 0.5 mole of 2-chloro-4-tertiarybutylphenol, 0.62 mole of potassium hydroxide and 665 milliliters of water is added to 0.54 mole of O-methyl phosphorodichloridothioate. In such an operation, the potassium hydroxide is employed as a 5 percent by weight aqueous solution. In a similar manner, other reaction systems are prepared in which the molar ratios of the reactants are kept constant but the concentration of the potassium hydroxide solution is varied from 8 to 20 percent by weight of aqueous mixture.

In each of the reaction systems, the mixture of phenol, potassium hydroxide and water is added portionwise in 30 minutes at a temperature of from 20°–30° C. to the O-methyl phosphorodichloridothioate with external cooling. Following the addition, the temperature is raised and maintained at 30°–35° C. for one-half hour. Upon completion of the reaction the reaction mixture is processed as described in Example 1. The yields of O-(2-chloro-4-tertiarybutylphenyl) O-methyl phosphorochloridothioate for the various reaction systems are set forth in the following table, the yields being based upon the phenolic starting material.

| Concentration of Potassium Hydroxide in Percent By Weight | Percent Yield of O-(2-chloro-4-Tertiarybutyl-phenyl) O-Methyl Phosphorochloridothioate |
| --- | --- |
| 5 | 59 |
| 8 | 62 |
| 10 | 86 |
| 15 | 91 |
| 20 | 92 |

EXAMPLE 3

*O-(2,4,5-Trichlorophenyl) O-Methyl Phosphorochloridothioate*

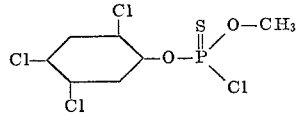

2,4,5-trichlorophenol (0.5 mole), 0.6 mole of sodium hydroxide and 96 grams of water are mixed together and added portionwise with stirring to 0.54 mole of O-methyl phosphorodichloridothioate. The addition is carried out in 30 minutes and at a temperature of from 20°–25° C. with external cooling. Following the addition, the temperature is raised to 30° C. and maintained thereat for one-half hour. The reaction mixture is then cooled to room temperature and successively washed with 10 percent aqueous sodium hydroxide and water, and thereafter dried at a temperature of 65° C. and under a vacuum of 13 millimeters. As a result of these operations, there is obtained an O-(2,4,5-trichlorophenol) O-methyl phosphorochloridothioate as a liquid material in a yield of 88 percent based upon the phenolic starting material.

EXAMPLE 4

*O-(2,4-Dichlorophenyl) O-Ethyl Phosphorochloridothioate*

2,4-dichlorophenol (0.5 mole), 0.6 mole of sodium hydroxide and 96 grams of water are mixed together and the resulting mixture added portionwise with stirring to 0.5 mole of O-ethyl phosphorodichloridothioate. The addition is carried out in 30 minutes at a temperature of 25°–30° C. with external cooling. Following the addition, the temperature of the reaction mixture is maintained at 30° C. for one-half hour. The reaction mixture is thereafter successively washed with 10 percent aqueous sodium hydroxide and water to obtain an O-(2,4-dichlorosodium hydroxide and water to obtain an O-(2,4-dichlorophenol) O-ethyl phosphorodichlorodiothioate as a liquid material in a yield of 90 percent based upon the O-ethyl phosphorodichloridothioate starting material.

EXAMPLE 5

*O-Phenyl O-Ethyl Phosphorochloridothioate*

A mixture consisting of 0.5 mole of phenol, 0.6 mole of sodium hydroxide and 96 grams of water is added portionwise to 0.5 mole of O-ethyl phosphorodichloridothioate. The addition is carried out in 30 minutes at a temperature of 20°–25° C. and with external cooling. Following the addition, the reaction mixture is brought to a temperature of 30° C. and maintained thereat for 30 minutes. The reaction mixture is thereafter cooled to room temperature and processed as described in Example 1 to obtain an O-phenyl O-ethyl phosphorochloridothioate product as a liquid material in a yield of 89.2 percent based upon the O-ethyl phosphorodichloridothioate starting material.

EXAMPLE 6

A mixture consisting of 0.5 mole of 2,4-dichlorophenol, 0.6 mole of sodium hydroxide and 466 milliliters of water is added to 0.54 mole of O-methyl phosphorodichloridothioate. In such an operation, the sodium hydroxide is employed as a 5 percent by weight aqueous mixture. In a similar manner, other reaction systems are prepared in which the molar ratios of the reactant are kept constant but the concentration of the sodium hydroxide solution is varied from 8–20 percent by weight of aqueous mixture.

In each of the reaction systems, the mixture of 2,4-dichlorophenol, sodium hydroxide and water is added portionwise in 30 minutes at a temperature of from 20°–30° C. to the O-methyl phosphorodichloridothioate with external cooling. Following the addition, the temperature is raised and maintained at 30°–35° C. for one-half hour. Upon completion of the reaction, the reaction mixture is processed as described in Example 1. The yields of O-(2,4-dichlorophenol) O-methyl phosphorochloridothioate for the various reaction systems are set forth in the following table, the yields being based upon the phenolic starting material.

| Concentration of Sodium Hydroxide in Percent By Weight | Percent Yield of O-(2,4-dichlorophenol) O-Methyl Phosphorochloridothioate |
| --- | --- |
| 5 | 60 |
| 8 | 62 |
| 10 | 85 |
| 15 | 89 |
| 20 | 91 |

The method of the present invention is useful for the preparation of many phosphorochloridothioate products. O-alkyl phosphorodichloridothioates which may be employed include O-methyl phosphorochloridothioate, O-ethyl phosphorochloridothioate, O-propyl phosphorochloridothioate, O-butyl phosphorochloridothioate and O-amyl phosphorochloridothioate. Particularly useful phenolic compounds include the methoxyphenols, the ethoxyphenols, the propoxyphenols, the chlorophenols, the bromophenols, the chlorobromophenols, the methylphenols, the ethylphenols, the chloroalkylphenols, the bromoalkylphenols, the phenylphenols, the benzylphenols, and the cyclohexylphenols.

Using such reagents, the method of the present invention may be employed to obtain the very desirable and outstanding yields of the following products:

O-(4-methoxyphenyl) O-ethyl phosphorochloridothioate
O-(4-bromo-2-ethylphenyl) O-butyl phosphorochloridothioate
O-(2-chloro-4-methoxyphenyl) O-methyl phosphorochloridothioate
O-(2-bromo-4-chlorophenyl) O-propyl phosphorochloridothioate
O-(4-tertiarybutylphenyl) O-ethyl phosphorochloridothioate
O-(4-chlorophenyl) O-ethyl phosphorochloridothioate
O-(3,4-dichlorophenyl) O-methyl phosphorochloridothioate
O-(4-chloro-2-methoxyphenyl) O-methyl phosphorochloridothioate
O-(4-benzylphenyl) O-isopropyl phosphorochloridothioate
O-(4-cyclohexylphenyl) O-methyl phosphorochloridothioate
O-(2-biphenylyl) O-methyl phosphorochloridothioate
O-(2-methylphenyl) O-methyl phosphorochloridothioate The O-lower alkyl phosphorodichloridothioates employed as starting materials in accordance with the teachings of the present invention may be prepared by the reaction of one molecular proportion of phosphorous thiochloride with one molecular proportion of a suitable alkali metal alkoxide in the corresponding alcohol. The reaction is somewhat exothermic and is carried out at a temperature of from −10° C. to 30° C. Upon completion of the reaction, the solvent may be removed by evaporation to obtain the desired O-lower alkyl phosphorochloridothioate as a liquid residue. The preferred embodiments of the present invention include the manufacture of the O-aryl O-lower alkyl phosphorochloridothioates, wherein aryl represents a phenyl radical of the benzene series unsubstituted or substituted by one or more substituents including chlorine, bromine, lower alkyl, lower alkoxy, phenyl, benzyl, or cyclohexyl. The terms lower alkyl and lower alkoxy refer to radicals containing from 1 to 5 carbon atoms, inclusive.

I claim:
1. A method for the manufacture of a phosphorochloridothioate comprising reacting together at a temperature of from 10° to 50° C. substantially equimolecular proportions of an O-lower alkyl phosphorodichloridothioate, an alkali metal hydroxide and a phenolic compound having the formula ROH, wherein R represents a member of the group consisting of phenyl and substituted phenyl in which the substituents are selected from the group consisting of chlorine, bromine, loweralkyl, loweralkoxy, phenyl, benzyl, and cyclohexyl, said alkali metal hydroxide being employed in the form of an aqueous solution containing at least 10 percent by weight of the alkali metal hydroxide.

2. A method for the manufacture of O-(2,4-dichlorophenol) O-methyl phosphorochloridothioate which comprises reacting together at a temperature of from 10° to 50° C. substantially equimolecular proportions of O-methyl phosphorodichloridothioate, 2,4-dichlorophenol and an alkali metal hydroxide, said alkali metal hydroxide being employed in the form of an aqueous solution containing at least 10 percent by weight of alkali metal hydroxide.

3. A method for the manufacture of O-(2-chloro-4-tertiarybutylphenyl) O-methyl phosphorochloridothioate which comprises reacting together at a temperature of from 10° to 50° C. substantially equimolecular proportions of O-methyl phosphorodichloridothioate, 2-chloro-4-tertiarybutylphenol and an alkali metal hydroxide, said alkali metal hydroxide being employed in the form of an aqueous solution containing at least 10 percent by weight of alkali metal hydroxide.

4. A method for the manufacture of O-(2,4,5-trichlorophenyl) O-methyl phosphorochloridothioate which comprises reacting together at a temperature of from 10° to 50° C. substantially equimolecular proportions of O-methyl phosphorodichloridothioate, 2,4,5-trichlorophenol and an alkali metal hydroxide, said alkali metal hydroxide being employed in the form of an aqueous solution containing at least 10 percent by weight of alkali metal hydroxide.

References Cited in the file of this patent
UNITED STATES PATENTS 2,575,225 Manske et al. _____ Nov. 13, 1951
2,887,506 Tolkmith et al. _____ May 19, 1959

FOREIGN PATENTS 522,732 Canada _____ Mar. 13, 1956

OTHER REFERENCES

Authenrieth et al.: Ber. Deut. Chem. 31, 1094–1113 (1898).
Authenrieth et al.: Ber. Deut. Chem. 58, 840–847 (1925).
Kosolapoff: "Organophosphorus Compounds," 1950, p. 231, John Wiley and Sons, Inc., New York, New York.
Mandelbaum et al.: Chemical Abstracts, 51, 1825 (1957).